(12) United States Patent
Dyck et al.

(10) Patent No.: US 11,008,847 B2
(45) Date of Patent: May 18, 2021

(54) DOWNHOLE GAS SEPARATOR

(71) Applicant: ExxonMobil Upstream Research Company, Spring, TX (US)

(72) Inventors: Carl J. Dyck, Calgary (CA); Jason Y. Wang, Spring, TX (US); Matthew R. Blandford, Cold Lake (CA)

(73) Assignee: ExxonMobil Upstream Research Company, Spring, TX (US)

( * ) Notice: Subject to any disclaimer, the term of this patent is extended or adjusted under 35 U.S.C. 154(b) by 33 days.

(21) Appl. No.: 16/570,112

(22) Filed: Sep. 13, 2019

(65) Prior Publication Data

US 2020/0131896 A1 Apr. 30, 2020

Related U.S. Application Data

(60) Provisional application No. 62/752,715, filed on Oct. 30, 2018.

(51) Int. Cl.
*E21B 43/38* (2006.01)
*E21B 4/04* (2006.01)
*B01D 19/00* (2006.01)

(52) U.S. Cl.
CPC .............. *E21B 43/38* (2013.01); *E21B 4/04* (2013.01); *B01D 19/0042* (2013.01); *B01D 19/0063* (2013.01); *E21B 2200/05* (2020.05)

(58) Field of Classification Search
CPC combination set(s) only.
See application file for complete search history.

(56) References Cited

U.S. PATENT DOCUMENTS

| | | | |
|---|---|---|---|
| 2,170,881 A | 8/1939 | Werts | |
| 2,986,216 A * | 5/1961 | McCulloch | E21B 43/14 166/114 |
| 3,249,055 A * | 5/1966 | Phillips | F04C 2/107 417/440 |
| 3,812,911 A * | 5/1974 | Vann | E21B 33/12 166/135 |
| 4,248,300 A * | 2/1981 | Braddick | E21B 47/117 166/386 |
| 4,676,308 A | 6/1987 | Chow et al. | |
| 5,407,010 A * | 4/1995 | Herschberger | E21B 43/122 166/372 |
| 6,668,925 B2 | 12/2003 | Shaw et al. | |

(Continued)

*Primary Examiner* — Cathleen R Hutchins
*Assistant Examiner* — Ronald R Runyan
(74) *Attorney, Agent, or Firm* — Leandro Arechederra, III

(57) ABSTRACT

Systems and a method for efficient downhole separation of gas and liquids while providing well access are provided. An exemplary system provides a downhole gas separator for an artificial lift system. The downhole gas separator includes an outer casing joined to production tubing at one end and comprising a fitting for a plug at an opposite end from the production line. The outer casing comprises openings through the outer casing. A dip tube extends through the interior of the outer casing, wherein the dip tube is fluidically coupled to the production tubing at one end, and is open to the outer casing at an opposite end, wherein the opposite end is proximate to the fitting for the plug. The plug is disposed in the fitting, and comprises a retrieval bar configured to allow the plug to be pulled through the production tubing to the surface.

19 Claims, 12 Drawing Sheets

(56) References Cited

U.S. PATENT DOCUMENTS

2005/0230121 A1* 10/2005 Martinez ............... E21B 43/122
                                                       166/372
2017/0138166 A1    5/2017  Wang et al.
2017/0138167 A1    5/2017  Wang et al.

* cited by examiner

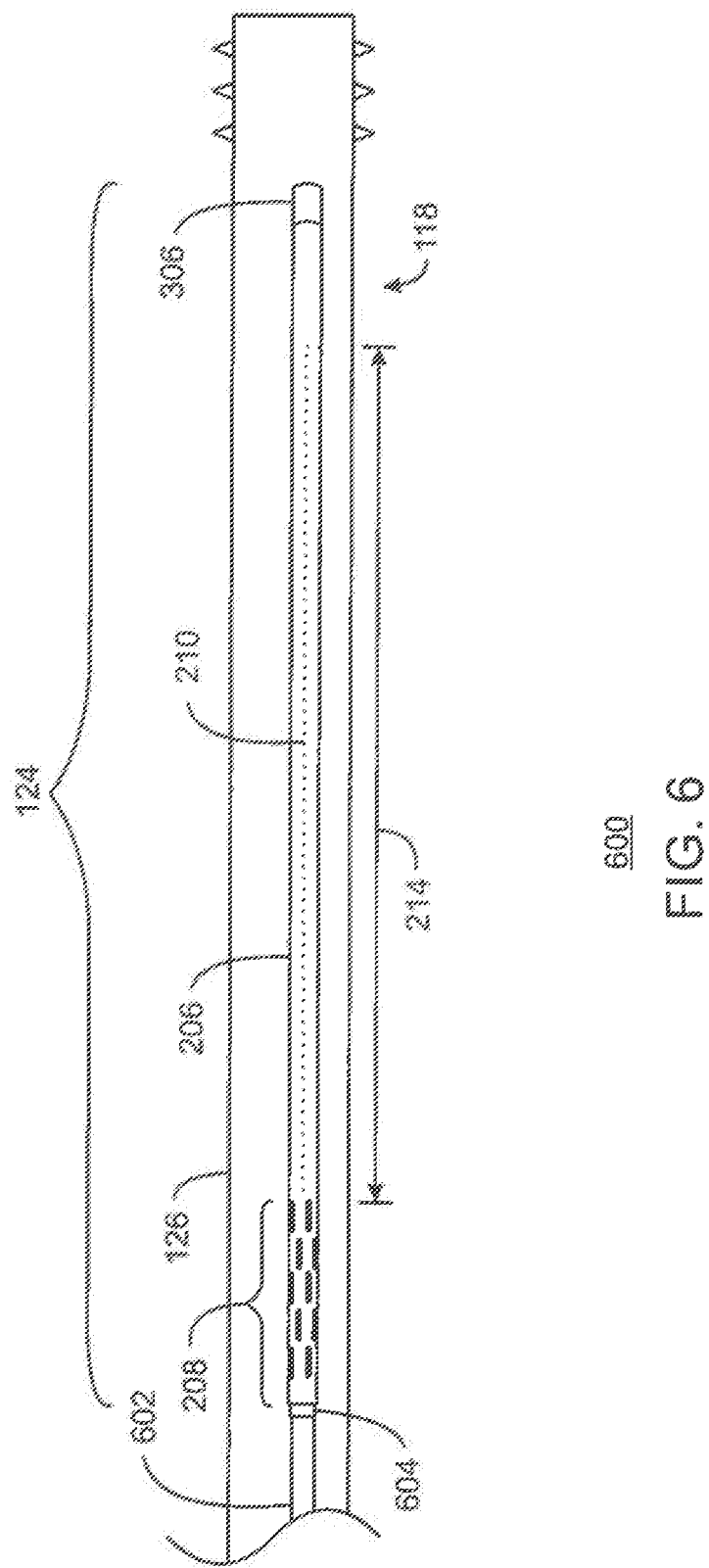

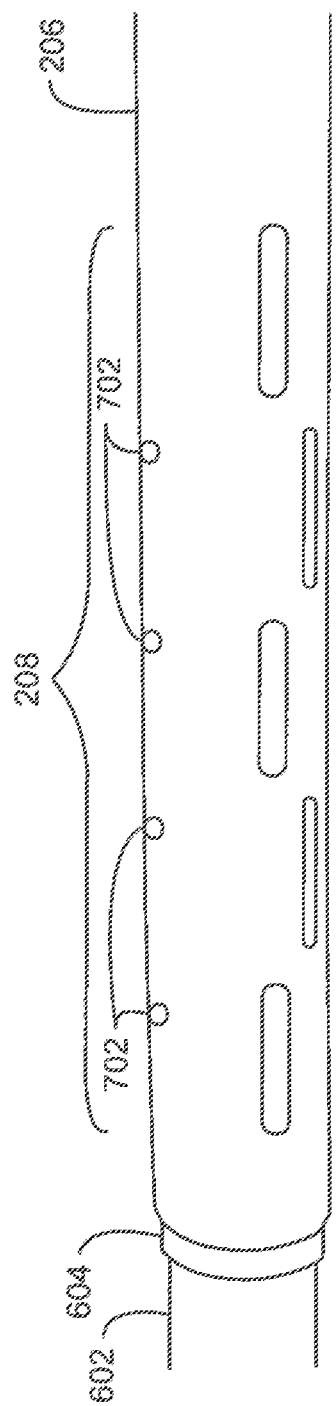

DOWNHOLE GAS SEPARATOR

CROSS-REFERENCE TO RELATED APPLICATION

This application claims the benefit of U.S. Provisional Application 62/752,715 filed Oct. 30, 2018 entitled "Downhole Gas Separator," the entirety of which is incorporated by reference herein.

FIELD

The techniques described herein relate to downhole gas separation systems. More particularly, the techniques relate to gas separation systems that allow servicing of a well without removal of the gas separation system from the well.

BACKGROUND

This section is intended to introduce various aspects of the art, which may be associated with example examples of the present techniques. This discussion is believed to assist in providing a framework to facilitate a better understanding of particular aspects of the present techniques. Accordingly, it should be understood that this section should be read in this light, and not necessarily as admissions of prior art.

Artificial lift systems are often used to produce liquid hydrocarbons from a hydrocarbon well. The artificial lift systems may include reciprocating pumps, such as a plunger lift system, or continuous pumps, such as downhole electric pumps.

However, gas that is present within the subterranean formation may become entrained with liquid hydrocarbon, and reduce the operational efficiency of the artificial lift system. In some situations, the gas may cause the artificial lift system to stop working. The decrease in operational efficiency may be mitigated by using a downhole gas separator to separate gas from the liquid hydrocarbons prior to the entry of liquid hydrocarbon into the artificial lift system. The gas is often diverted to the casing, while the liquid hydrocarbons are produced through a production tube, disposed within the casing.

Research has continued into identifying efficient downhole gas separators. For example, U.S. Patent Application Publication No. 2017/0138166, by Wang et al., discloses downhole gas separators and methods of separating a gas from a liquid within a hydrocarbon well. As described therein, the downhole gas separators include an elongate outer housing that defines an enclosed volume, a fluid inlet port, and a gas outlet port. The downhole gas separators further include an elongate dip tube that extends within the enclosed volume, and the gas outlet port is configured to selectively provide fluid communication between the enclosed volume and an external region.

Similarly, U.S. Patent Application Publication No. 2017/0138167, by Wang et al., discloses a horizontal well production apparatus and a method for using the same. The application describes artificial lift apparatus, systems, and methods for use in a deviated or horizontal wellbore, including downhole gas separators, hydrocarbon wells including the artificial lift systems, and methods of separating a gas from a liquid hydrocarbon within a hydrocarbon well. A downhole gas separator is positioned in a deviated or horizontal wellbore. The downhole gas separator includes a flow regulating device configured to restrict fluid flow through the gas outlet during at least a portion of each intake stroke of a reciprocating pump and to permit the fluid flow during at least a portion of each exhaust stroke of the reciprocating pump.

While improving the separation efficiency of a downhole gas separator may improve the operational efficiency of the artificial lift system, current downhole gas separators may increase operational costs for wells. For example, performing cleanout procedures, and other procedures in the well, often requires that the downhole gas separators and production tubing are removed from the wellbore before the procedures are performed.

SUMMARY

An embodiment described herein provides a downhole gas separator for an artificial lift system. The downhole gas separator includes an outer casing joined to production tubing at one end and comprising a fitting for a plug at an opposite end from the production line. The outer casing comprises openings through the outer casing. A dip tube extends through the interior of the outer casing, wherein the dip tube is fluidically coupled to the production tubing at one end and is open to the outer casing at an opposite end, wherein the opposite end is proximate to the fitting for the plug. The plug is disposed in the fitting, and includes a latching device configured to allow the plug to be pulled through the production tubing to the surface.

Another embodiment described herein provides a method for servicing a well having a downhole gas separator. The method includes pulling a retrievable plug from a downhole gas separator to the surface through production tubing, and servicing the well through an open end of the downhole gas separator. The retrievable plug is reinstalled into the downhole gas separator through the production tubing.

Another embodiment described herein provides a system for producing liquids from a well. The system includes production tubing placed inside the well casing for transferring liquids to the surface. The system also includes a downhole gas separator that includes an outer casing joined to production tubing at one end and comprising a fitting for a plug at an opposite end from the production line, wherein the outer casing comprises openings through the outer casing. In the downhole gas separator, a dip tube extends through an interior of the outer casing, wherein the dip tube is fluidically coupled to the production tubing at one end, and is open to the outer casing at an opposite end, wherein the opposite end is proximate to the fitting for the plug. The plug is disposed in the fitting, and comprises a latching device configured to allow the plug to be pulled through the production tubing to the surface. A pump is fluidically coupled between the production tubing and the dip tube.

DESCRIPTION OF THE DRAWINGS

The foregoing and other advantages of the present techniques may become apparent upon reviewing the following detailed description and drawings of non-limiting examples of examples in which:

FIG. 6 is a drawing of an overview of the downhole gas separator, in accordance with examples;

FIGS. 7(A) and 7(B) are drawings of the openings in the outer casing, in accordance with examples;

Figure 1:
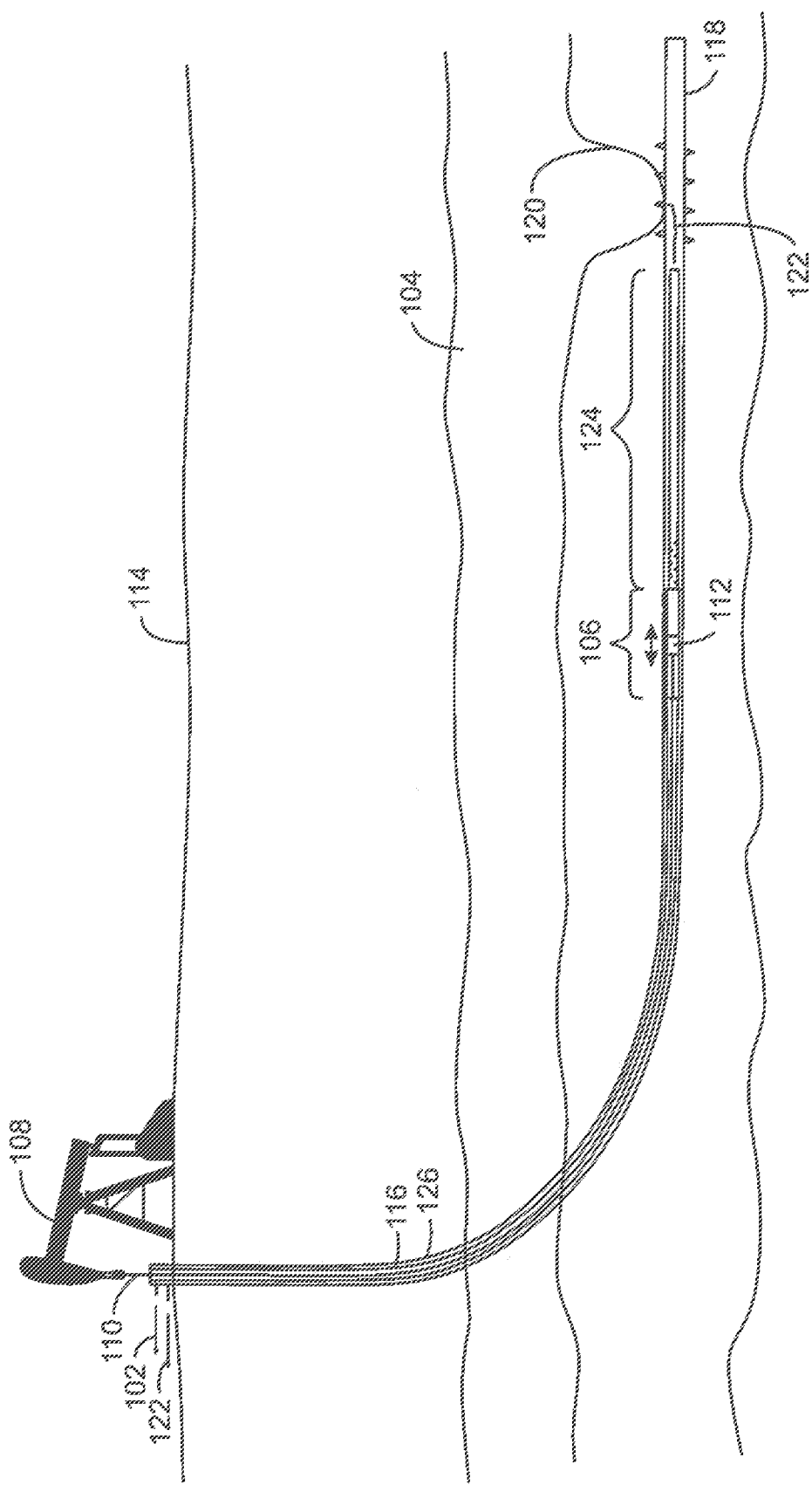
FIG. 1 is a drawing of a system for producing liquid from a reservoir using a reciprocating piston pump, in accordance with examples.

It should be noted that the figures are merely example of several examples of the present techniques and no limitations on the scope of the present techniques are intended thereby. Further, the figures are generally not drawn to scale, but are drafted for purposes of convenience and clarity in illustrating various aspects of the techniques.

DETAILED DESCRIPTION

In the following detailed description section, the specific examples of the present techniques are described in connection with preferred examples. However, to the extent that the following description is specific to a particular embodiment or a particular use of the present techniques, this is intended to be for example purposes only and simply provides a description of the example embodiments. Accordingly, the techniques are not limited to the specific examples described below, but rather, it includes all alternatives, modifications, and equivalents falling within the true spirit and scope of the appended claims.

Gas entrainment during production from wells may interfere with pumping efficiency, and may result in a complete drop-off of liquid production. Further, low gas separation efficiency using some current technologies may result in limited liquid production rate. Separators have been tested to mitigate this problem, for example, available from the Weatherford Corporation, have demonstrated an increase in liquid production due to more efficient gas separation. However, these separators have required pulling the production tubing to perform coiled tubing workovers (CTW). A separator that would allow a CTW without pulling the production tubing would have a significant economic impact. As used herein, a CTW includes, for example, a well cleanout operation, well treating, replacement of downhole parts and devices, and the like.

Examples described herein provide a downhole gas separator that allows efficient separation of gas from liquids, while allowing CTW to be performed in the well without pulling the production tubing string from the well. The downhole gas separator includes an outer casing that is physically joined to the production tubing. A dip tube, extending along the inside of the outer casing, is fluidically coupled to the production tubing. The outer casing comprises openings, or slots, around the circumference to allow liquids to flow into the outer casing and gas to flow out of the outer casing. The openings are located at the end of the outer casing that is physically joined to the production tubing. The dip tube opens near the opposite end of the outer casing from the slots. A retrievable plug is placed in the outer casing to block liquid from entering the end of the outer casing. If the well needs to be reworked, such as for a cleanout, the retrievable plug may be retrieved through the production tubing, allowing the cleanout to be performed through the production tubing, without removing the production tubing.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, "artificial lift" techniques are used to produce liquid hydrocarbons from wells. The artificial lift techniques are implemented by devices such as reciprocating piston pumps and electric submersible pumps, among others. Reciprocating piston pumps use a piston which is actuated by a rod from the surface. The piston moves up and down in a cylinder that forms the pump. As the rod forces the piston downwards in the cylinder, pressure opens a valve on the piston allowing liquids to flow past the piston. When the rod reaches a full downwards extension, the rod starts to pull the piston upwards, which closes the valve on the piston and allows the liquid to be lifted by the piston. As the piston is lifted, the pressure drop below it causes a valve on the bottom of the cylinder to open, allowing more fluid to flow into the cylinder. As the piston is pulled upwards, the liquid flows out of the top of the cylinder towards the surface, for example, through a production line. When the rod reaches a full upwards extension, and starts to push the piston downwards, the valve on the bottom of the cylinder closes. The cycle is then repeated as the rod pushes the piston back downwards, with the valve on the piston opening to allow liquids to flow past the piston. This reciprocating action pumps liquids to the surface.

An electrical submersible pump (ESP) is another type of artificial lift system used pump liquids from a well to the surface. An ESP is a continuous pump that is powered by an electric cable from the surface, and is placed in the well. The ESP may be used in wells for which a higher production rate is desirable, where the use of a reciprocating oil pump may not be practical.

As used herein, "casing" refers to a protective lining for a wellbore. Any type of protective lining may be used, including those known to persons skilled in the art as liner, casing, tubing, etc. Casing may be segmented or continuous, jointed or unjointed, made of any material (such as steel, aluminum, polymers, composite materials, etc.), and may be expanded or unexpanded, etc.

As used herein, "crude oil" or "hydrocarbon liquids" are used to denote any carbonaceous liquid that is derived from petroleum. Included among these liquids are whole crude oil itself and petroleum residuum-based fuel oils including bunker fuels and residual oils. Crude oil has a wide boiling ranges and sulfur content in different fractions. The present invention is particularly useful for feedstocks that can be described as high boiling point feeds of petroleum origin, since these feeds generally contain higher levels of the aromatic sulfur compounds. The exact cut point selected will depend on the sulfur specification for the gasoline product as well as on the type of sulfur compounds present. Sulfur, which is often present in components boiling below 65° C., is mostly in the form of mercaptans and may be removed by extractive type processes.

As used herein, "gas" refers to any chemical component that exists in the gaseous state, i.e., not liquid or solid, under relevant downhole conditions regardless of the identity of the chemical substance. For example, the gas may include methane, ethane, nitrogen, helium, carbon dioxide, water vapor, or hydrogen sulfide, or any combinations thereof, among others.

As used herein, "liquid" refers to any chemical component that exists in the liquid state, i.e., not gas or solid, under relevant downhole conditions regardless of the identity of the chemical substance. For example, the liquid may include crude oil or water, or any combinations thereof, among others.

As used herein, "production tubing" is a tubular line used to convey liquid hydrocarbons from a formation to the surface. At the surface, the production tubing couples to a wellhead that transfers the liquid hydrocarbons to a production line for collection. The production tubing is often placed in a cased well. This creates an outer annulus that may be used to convey gas, separated from the liquid hydrocarbon, to the surface.

A "well" or "wellbore" refers to holes drilled to produce liquids from subsurface reservoirs. The wellbore may be drilled vertically, or at a slant, with deviated, highly deviated, or horizontal sections of the wellbore. The term also includes wellhead equipment, surface casing, intermediate casing, and the like, typically associated with oil and gas wells.

FIG. 1 is a drawing of a system 100 for producing liquid 102 from a reservoir 104 using a reciprocating piston pump 106, in accordance with examples. In the system 100, a pump jack 108 moves a rod 110 that moves a piston 112 in the reciprocating piston pump 106. The rod 110, may be a sucker rod or a continuous rod. As described herein, as the piston is pulled towards the pump jack 108 it pushes the liquid 102 to the surface 114, through production tubing 116.

However, during periods in a cycle in which the piston 112 is moving towards the pump jack 108, the lower pressure in the wellbore 118 may draw down the hydrocarbon liquid level 120 in the reservoir 104, leading to the entrainment of gas 122 in the liquid 102. This may lower the effectiveness of the reciprocating piston pump 106, decreasing the amount of liquid 102 that reaches the surface 114. In some cases, the entrainment of the gas 122 in the liquid 102 may stop the ability of the reciprocating piston pump 106 to move the liquid 102 to the surface 114.

To decrease or eliminate the entrainment of the gas 122 in the liquid 102, a downhole gas separator 124 may be coupled to the production tubing 116. The downhole gas separator 124 provides a volume reservoir in which gas 122 may be separated from the liquid 102 by gravity, allowing the liquid 102 to be drawn into a dip tube by the reciprocating piston pump 106. In some examples described herein, the dip tube is the reciprocating piston pump 106. The gas 122 may then escape into the outer annulus between the production tubing 116 and the casing 126. At the surface 114, the gas 122 is produced from the casing 126, and may be collected by a gas line along with gas from other wells.

It can be noted that the liquid 102 may be a hydrocarbon liquid, water, or a mixture of hydrocarbon liquid and water. In various examples, the liquid 102 is processed at the surface to separate hydrocarbon liquid and water.

Figure 2:
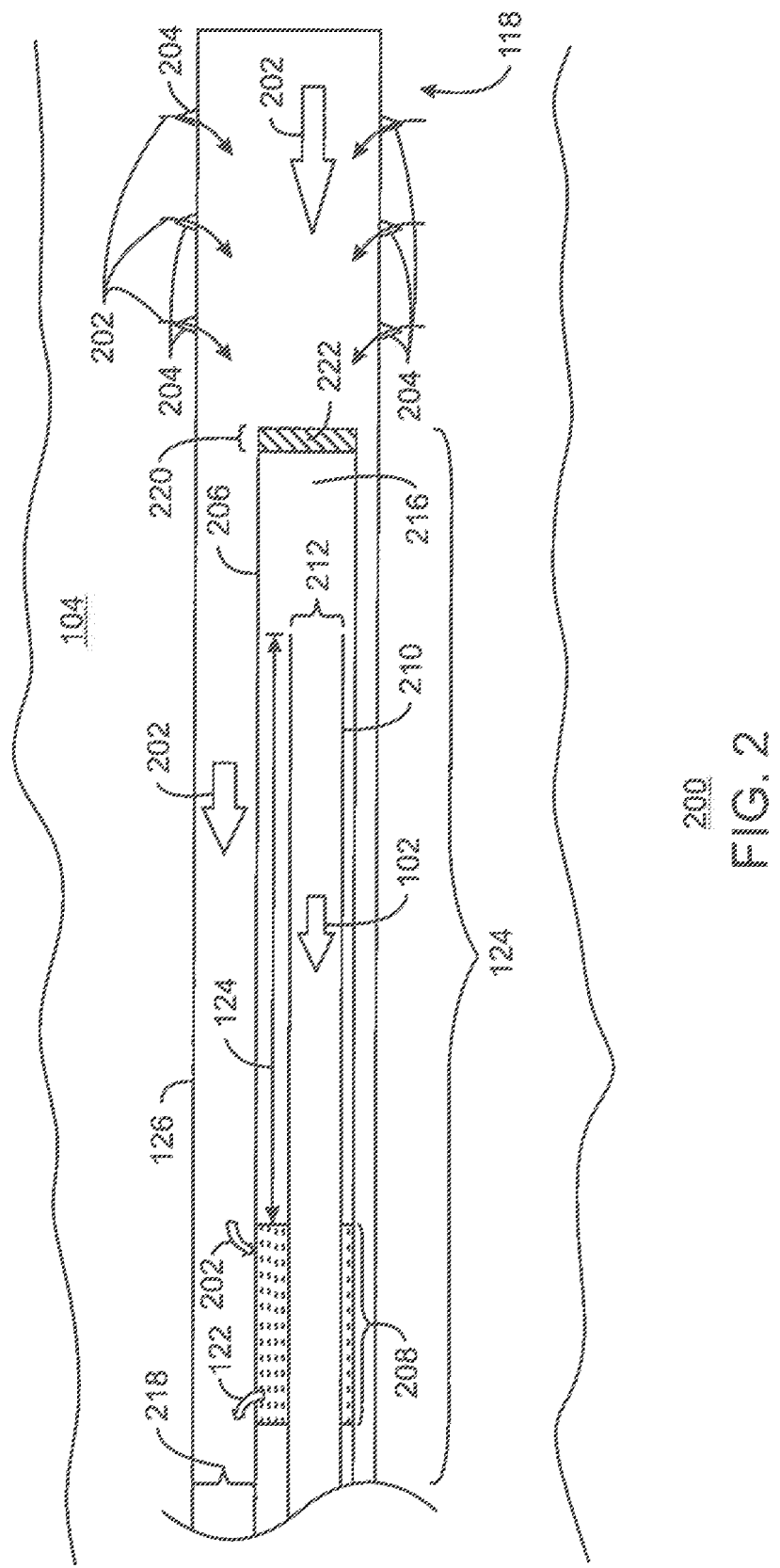
FIG. 2 is a schematic diagram of the operation of a downhole gas separator, in accordance with examples.

FIG. 2 is a schematic diagram 200 of the operation of a downhole gas separator 124, in accordance with examples. Like numbered items are as described with respect to FIG. 1. In the schematic diagram 200, material 202 from the reservoir 104 enters the casing 126 of the wellbore 118 through perforations 204. The material 202, which may include liquid and gas from the reservoir 104, moves around an outer casing 206 of the downhole gas separator 124. The material 202 may be pulled into the outer casing through openings 208 in the outer casing, as a reciprocating piston pump, ESP, or other pump, pulls liquid 102 into a dip tube 210. The dip tube 210 may have an open end 212 that is placed at a distance 214 from the openings 208 in the outer casing 206. In various examples, the open end 212 of the dip tube 210 may be placed at a distance 214 of about one meter (m), about 2 m, or about 3 m, or higher, from the openings 208 in the outer casing 206. This may provide a reserve volume 216 of liquid 102 during the pumping cycle of a reciprocating piston pump, allowing the reciprocating piston pump to pull liquid 102 without entraining gas 122. During a recovery cycle of the reciprocating piston pump, gas 122 exits the outer casing 206 through the openings 208, and moves to the surface through the outer annulus 218.

The techniques are not limited to the use of the reciprocating piston pump. As described herein, an ESP may be used to continuously flow liquid to the surface. In this example, the reserve volume 216 provides a counter flowing region in which the gas 122 may separate from the material 202. In the counter flowing region, the liquid flows downward, which can cause the gas bubbles to accumulate and exhaust themselves out of the openings 208 along the outer casing 206.

The downhole gas separator 124 may provide a highly effective system for removing gas 122 from liquid 102 before pumping the liquid 102 to the surface. However, a closed end 220 of the outer casing 206, used to prevent materials 202 from directly entering the dip tube 210, may block reworking of the wellbore 118, for example, using a coiled tubing for a CTW. In examples described herein, the closed end 220 of the outer casing 206 is sealed with a retrievable plug 222, or plug, as also used herein. In some examples, the retrievable plug 222 is pulled through the dip tube 210, and through production tubing, to the surface. This opens the end of the outer casing 206, allowing coiled tubing to be used for performing CTW operations in the wellbore 118 through the production line and downhole gas separator 124.

Figure 3:
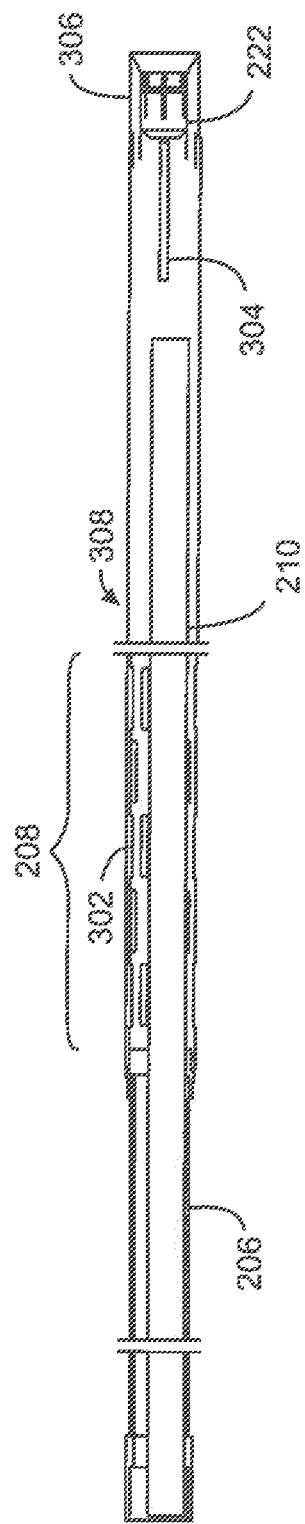
FIG. 3 is another drawing of the downhole gas separator, in accordance with examples.

FIG. 3 is another drawing of the downhole gas separator 124, in accordance with examples. Like numbered items are as described with respect to FIGS. 1 and 2. The openings 208 may be optimized for the transfer of materials into and out of the outer casing 206. In various examples, the openings 208 are slots 302 placed in an alternating pattern around the circumference of the outer casing 206. The retrievable plug 222 may have a retrieval handle 304 that allows a work string that may be coiled tubing, sucker rod, continuous rod, threaded tubing, or other device, to connect to the retrievable plug 222 to pull it out through the production tubing. It can be noted that the retrieval handle 304 may be replaced with any number of other latching devices to allow a retrieval system to lock onto the retrievable plug 222. In some examples, the retrievable plug 222 may have a specific profile or thread for the latching device to mate to.

The retrievable plug 222 may be locked in place in the downhole gas separator 124 in a mount 306. The dip tube 210 may extend through the interior of the downhole gas separator 124 and end proximate to the mount 306, for example, within about 0.5 m of the retrieval handle 304, within about 1 m of the retrieval handle 304, or within about 2 m of the retrieval handle 304. The dip tube 210 may be proximate to the bottom of the downhole gas separator 124, for example, lying along or close to the bottom surface 308 of the downhole gas separator 124.

Figure 4:
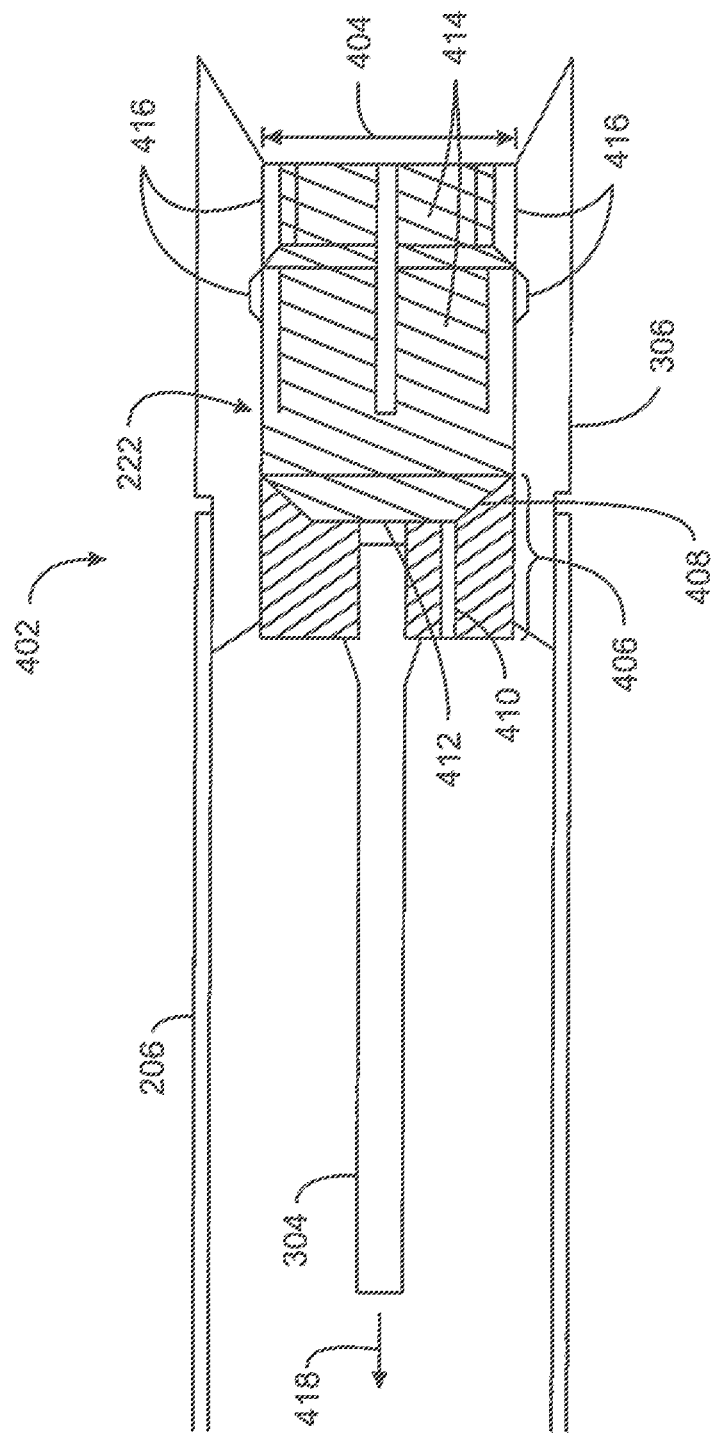
FIG. 4 is a cutaway view of a retrievable plug, locked in place in a mount at the end of an outer casing, in accordance with examples.

FIG. 4 is a cutaway view 402 of a retrievable plug 222, locked in place in a mount 306 at the end of an outer casing 206, in accordance with examples. Like numbered items are as described with respect to FIGS. 2 and 3. The mount 306 and the retrievable plug 222 have a diameter 404 that is smaller than the inner diameter of the production tubing to allow the retrievable plug 222 to be pulled through the production tubing. In the examples shown in FIGS. 2, 3, and 6, the dip tube 210 forms part of an insert pump that is retrievable, eliminating any need to pull the retrievable plug 222 through a dip tube. In some examples, a permanent tube is used, as described with respect to FIG. 9. In these examples, the diameter of the retrievable plug 222 is smaller than the permanent dip tube to allow the retrievable plug 222 to be pulled through the permanent dip tube and the production tubing.

The retrievable plug 222 has a solid section 406 with a plunger-shaped cup 408 at one end. A small hole 410 may be included in the solid section 406 to equalize pressure on each side, for example, to ease pulling the retrievable plug 222 through the production tubing and draining the assembly at the surface. The retrieval handle 304 may be fixed to the solid section 406, threaded to a mounting point 412 located in the base of the cup. In other examples, the retrieval handle 304 is not used, and the retrieval device latches or threads into a hole on the plug, or attaches onto another latching device on the retrievable plug 222, such as a metal loop fixed to the retrievable plug 222.

A number of flexible collets 414 may be joined to the top of the plunger-shaped cup 408. The flexible collets 414 snap into grooves 416 in the mount 306, forming a snap-collet retention system, to hold the retrievable plug 222 in place. In various examples, the retrievable plug 222 is pulled from the mount 306 by exerting a force 418 on the retrieval handle 304. The force 418 is selected by the pressure of the well. In examples, the force 418 is about 500 pounds, 1000 pounds, 2000 pounds, or higher.

Once the retrievable plug 222 has been pulled from the mount 306, it is removed through the production tubing to the surface. This leaves an opening through the mount 306 at the end of the outer casing 206 to allow the passage of coiled tubing into the well for reworking and other operations. In some examples, the reciprocating piston pump 106, or other type of pump, is pulled from the well before the retrievable plug 222 is accessed.

Figure 5:
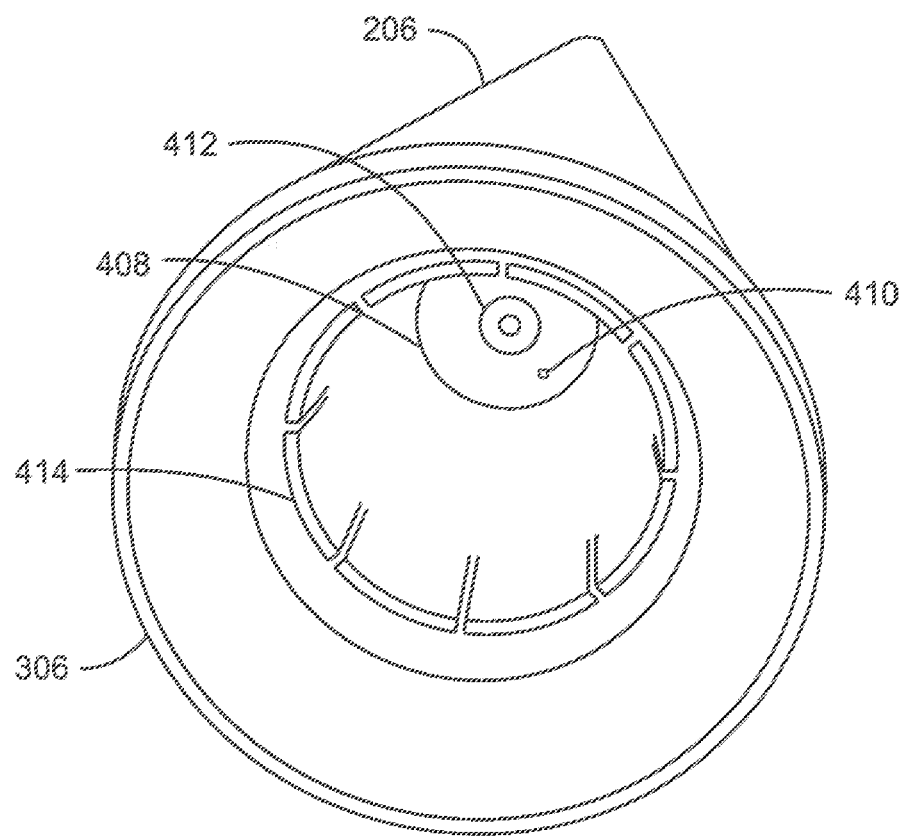
FIG. 5 is a front perspective view of the downhole gas separator, in accordance with examples.

FIG. 5 is a front perspective view 500 of the downhole gas separator 124, in accordance with examples. Like numbered items are as described with respect to FIGS. 2 and 4. In the front perspective view 500, the plunger-shaped cup 408 is visible, showing the mounting point 412 for the retrieval handle 304 (FIG. 3) and the front of the small hole 410 used for pressure equalization, for example, as the retrievable plug 222 (FIG. 2) is pulled up the production tubing. The flexible collets 414, used to hold the retrievable plug 222 in the mount 306, are also visible in the front perspective view 500.

FIG. 6 is a drawing of an overview 600 of the downhole gas separator 124, in accordance with examples. Like numbered items are as described respect to FIGS. 1 and 2. The overview 600 shows the production tubing 602 that is attached to one end of the downhole gas separator 124. The mount 306 for the retrievable plug 222 is shown at an opposite end of the downhole gas separator 124 from the production tubing 602. As can be seen in the overview 600, the openings 208 in the outer casing 206 of the downhole gas separator 124 are placed near the collar 604 that attaches the downhole gas separator 124 to the production tubing 602, at the opposite end of the downhole gas separator 124 from the mount 306. In an example, the collar 604 is a welded crossover that is the same diameter as the production tubing.

The dip tube 210 is fluidically coupled to the production tubing 602 and extends through the interior of the outer casing 206 to a point proximate to the retrievable plug 222 held by the mount 306. The distance 214 may be selected based on expected production rates, or the amount of gas 122 (FIG. 1) versus the amount of liquid 102 in the reservoir. For example, a longer distance 214 may be used for reservoirs that have a higher liquid production rates or gas to liquid ratio. As the ratio of gas to liquid increases during production from the reservoir, the downhole gas separator 124 may be pulled and replaced with a downhole gas separator 124 having a greater distance 214. Generally, though, the downhole gas separator 124 will be selected during an initial design phase based on the anticipated well parameters, including the liquid production rate, gas to liquid ratio, the diameter of any bends in the wellbore 118, and other parameters. In the example shown in the overview 600, the distance 214 is about four to five meters.

Figure 7A:
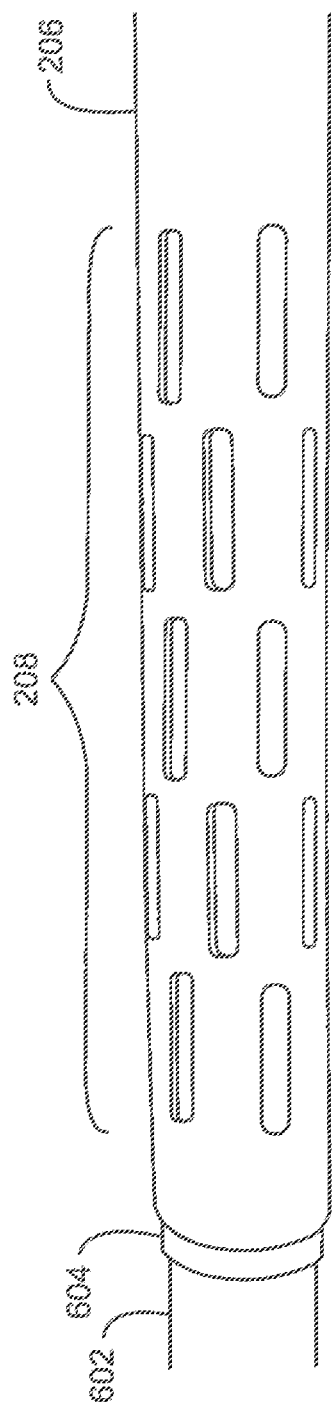

FIGS. 7(A) and 7(B) are drawings of the openings 208 in the outer casing 206, in accordance with examples. Like numbered items are as described with respect to FIGS. 2 and 6. The drawing in FIG. 7(A) illustrates the collar 604 that connects the production tubing 602 to the outer casing 206. The openings 208 may include any combinations of holes, elongated slots, or other openings. The design of the openings 208 is chosen to increase liquid intake while allowing gas to escape. In some examples, the openings 208 are alternating slots placed around the entire circumference of the outer casing 206, for example, as shown in the drawings of FIGS. 7(A) and 7(B).

In other examples, as shown in FIG. 7(B), slots are placed along the lower half of the outer casing. In this example, holes 702 are placed at the top of the outer casing 206, to allow gas to escape the outer casing 206.

Figure 8A:
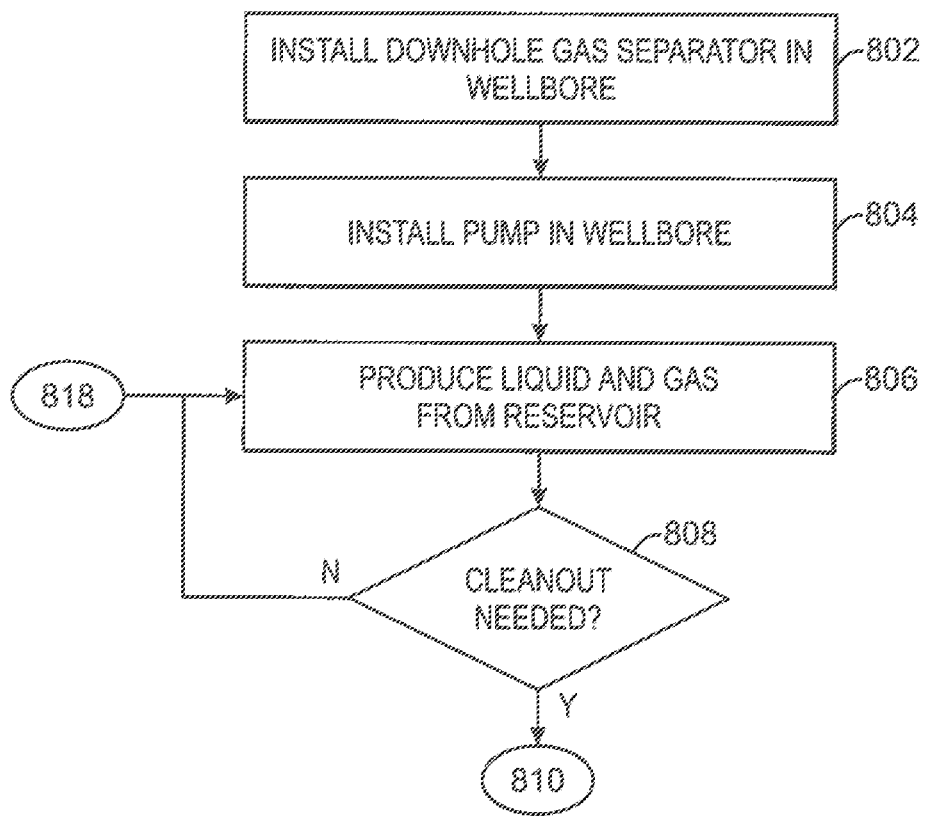
FIGS. 8(A) and 8(B) are process flow charts of a method for performing a coiled tubing workover (CTW) using the downhole gas separator, in accordance with examples.
Figure 8B:
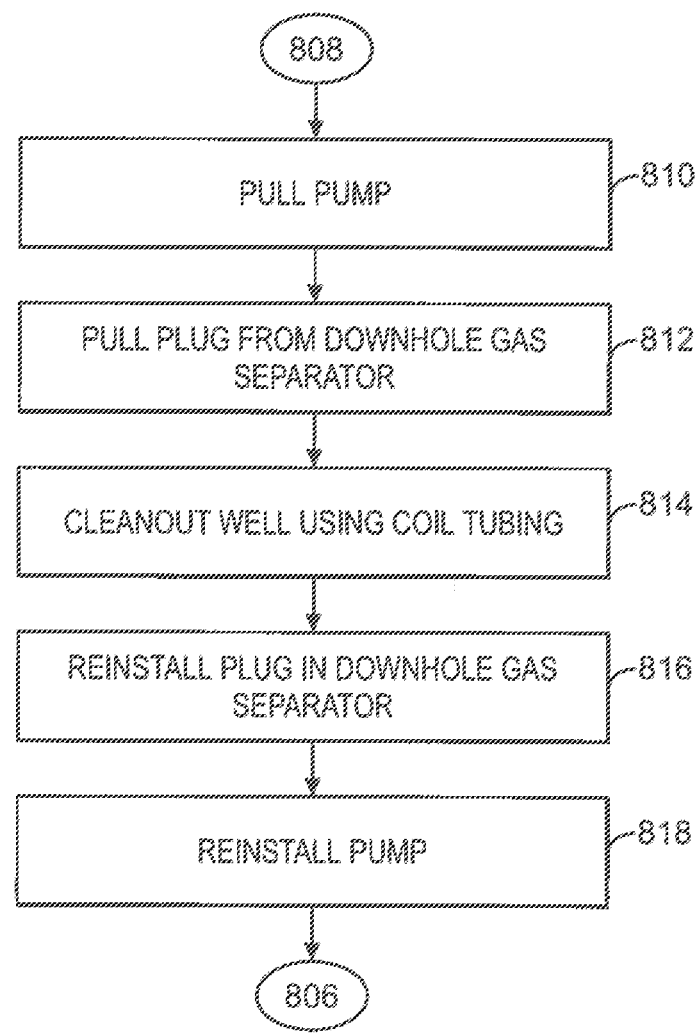

FIGS. 8(A) and 8(B) are process flow charts of a method 800 for performing a well cleanout using the downhole gas separator, in accordance with examples. The method begins at block 802, when the downhole gas separator is installed in the wellbore. This is performed by attaching the downhole gas separator to the end of production tubing used to produce liquids from the reservoir. The downhole gas separator followed by the production tubing is then inserted into the wellbore to the operational location.

At block 804, a pump is installed in the wellbore, for example, being lowered through the production tubing. The pump may be a reciprocating piston pump or an ESP, among others. In an example, the pump is installed as part of the dip tube of the downhole gas separator. The pump is then coupled to the power source, for example, being coupled to a rod connected to a pump jack, or to a downhole electric power cable. In other examples, the pump is installed inside a permanent dip tube, or in a section of production tubing downstream of the downhole gas separator.

At block 806, liquid and gas are produced from the reservoir. As described herein, the downhole gas separator diverts a substantial portion of the gas into the well casing, which allows the liquid to be pumped out through the production tubing.

At block 808, a determination is made as to whether a CTW, such as a well cleanout or other well refurbishing operation, is needed. The determination may be made, for example, by noticing a drop off in production rates, an increase in a water/oil ratio, or other indication that well servicing is needed. If no cleanout, or other well refurbishing operation, is needed, then process flow returns to block 806, and production continues.

If it is determined at block 808 that a CTW is needed, process flow proceeds to block 810 (FIG. 8(B)). At block 810, the pump is pulled from the well. In some examples the pump is an insert pump, such as a rod pump or a coiled tubing deployed ESP. The pump is retrieved out using the rods or coiled tubing that it was deployed on. In some examples, the power source may be connected to the pump in association with a cable that may allow the pump to be pulled out directly.

At block 812, the retrievable plug is pulled from the downhole gas separator and brought to the surface through the production tubing. This may be performed by coupling a coiled tubing line to the retrieval handle, and pulling with enough force to snap the retrievable plug out of the collet, for example, at about 1000 pounds of pull force. As the retrievable plug is pulled through the production tubing, the small hole described herein may allow for pressure equalization before and after the retrievable plug to avoid the retrievable plug getting caught in the production tubing. In some examples, the small hole is not present, and the retrievable plug is small enough relative to the production tubing that the pressure can equalize around the sides of the retrievable plug.

At block 814, the CTW is performed using a coiled tubing line. The CTW procedure may involve sand removal, additional fracking procedures, chemical treatment procedures, repair of broken equipment, and the like.

At block 816, the retrievable plug is reinstalled in the downhole gas separator. This may be performed using a coiled tubing line to push the retrievable plug back through the production tubing and through the downhole gas separator to the mount. The beveled edges of the mount direct the retrievable plug back to the center of the mount, and align the retrievable plug with the mount. As the retrievable plug is pushed back into the mount, the flexible plates snap in place in the collet.

At block 818, the pump is reinstalled. This may follow the same procedure as described with respect to block 804. Once the pump is reinstalled, process flow resumes at block 806 (FIG. 8(A)) with the production of liquid and gas from the reservoir.

Figure 9A:
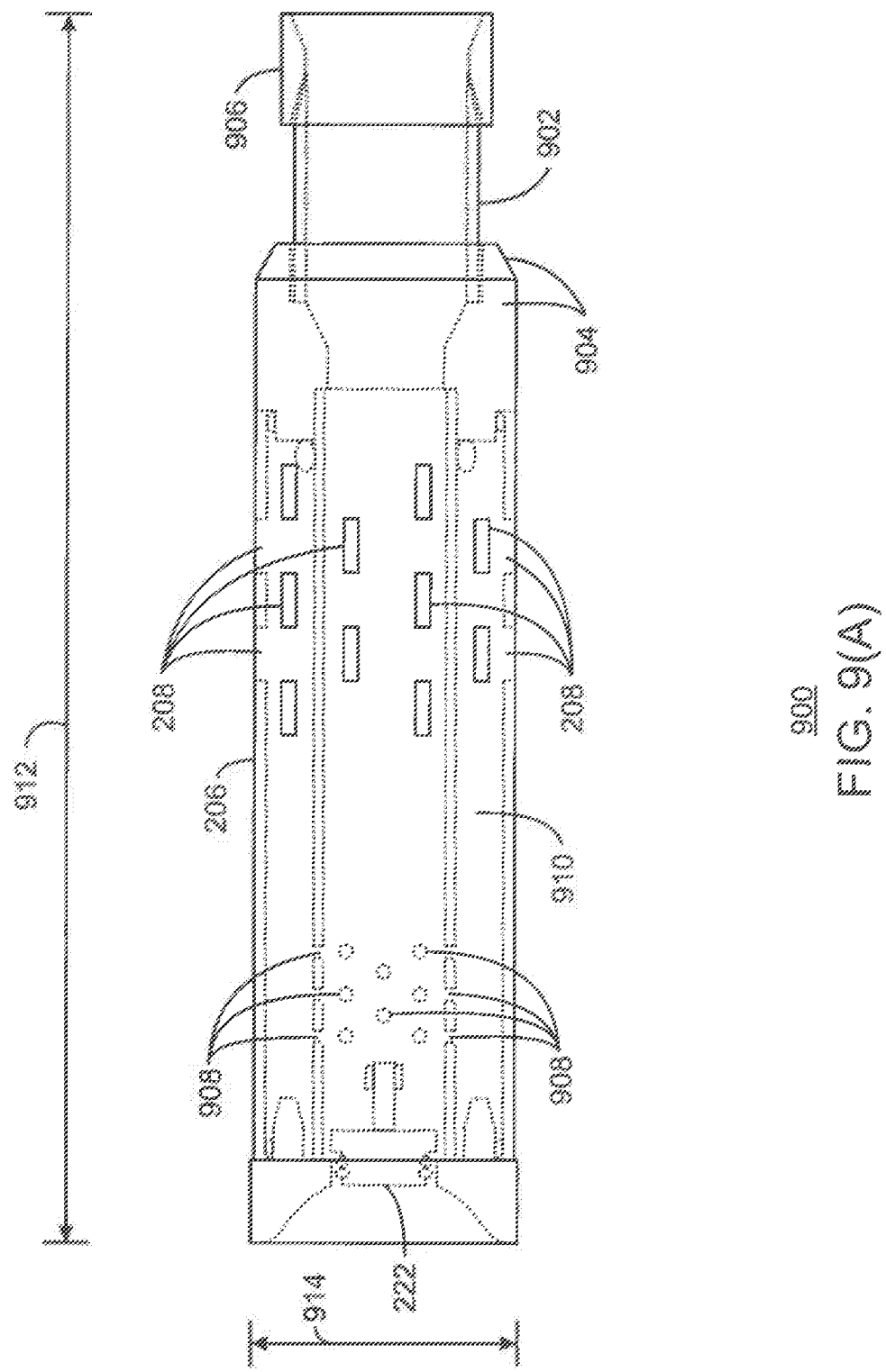
FIGS. 9(A) and 9(B) are drawings of another downhole gas separator, in accordance with examples.
Figure 9B:
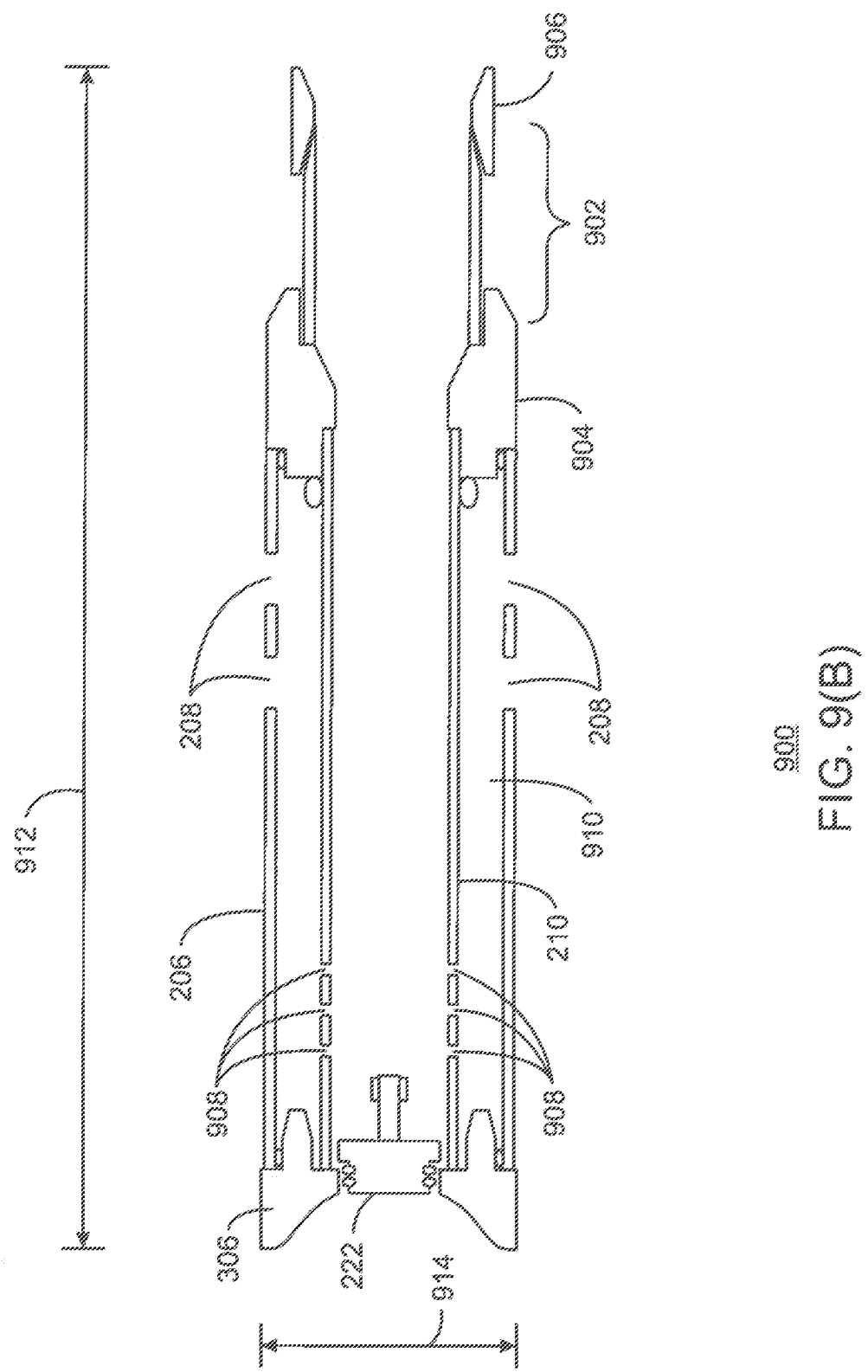

FIGS. 9(A) and 9(B) are drawings of another downhole gas separator 900, in accordance with examples. Like numbered items are as described with respect to FIGS. 3 and 4. FIG. 9(A) is a side view of the downhole gas separator 900, in accordance with examples. Structures inside the outer casing 206 of the downhole gas separator 900 are shown as dotted lines in FIG. 9(A). FIG. 9(B) is a cross-sectional view of the downhole gas separator 900, in accordance with examples.

In the design shown in FIGS. 9(A) and 9(B), the dip tube 210 is permanently mounted in the downhole gas separator 900. An insert pump may be inserted through the production tubing, through a landing zone 902 and into the dip tube 210 to pull liquids from the dip tube 210. A coupling 904 joins the landing zone 902 to the outer casing 206 and another coupling 906 joins the landing zone 902 of the downhole gas separator 900 to the production tubing.

Openings 208 are made in the outer casing 206, for example in the shape of slots, allow liquid and gas to flow into and out of the outer casing 206. Holes 908 are made in the dip tube 210 proximate to the retrievable plug 222. The openings 208 in the outer casing 206 are formed near the coupling 904, and, thus, are higher in the well than the holes 908 in the dip tube 210 once the downhole gas separator 900 is lowered into the well. The empty space 910 between the outer casing 206 and the dip tube 210 forms a pool, or reservoir of liquid, that can be pulled from the dip tube 210 through the holes 908.

The downhole gas separator 900 may be less than about 10 m in length 912, or less than about 8 m in length 912, less than about 5 m in length 912, or less than about 2 m in length 912. A longer downhole gas separator 900 may work better in more horizontal applications, or in applications in which the ratio of gas to liquid flow is higher. A shorter downhole gas separator 900 may work better in more vertical applications, or in applications in which the ratio of gas to liquid flow is lower. The diameter 914 of the downhole gas separator 900 may be less than about 18 cm, or less than about 15 cm, or less than about 12 cm. The selection of the length 912 and diameter 914 may be made on the basis of the diameter of the well casing, as well as the radius of curvature of any curved sections in the well.

While the present techniques may be susceptible to various modifications and alternative forms, the example examples discussed above have been shown only by way of example. However, it should again be understood that the present techniques are not intended to be limited to the particular examples disclosed herein. Indeed, the present techniques include all alternatives, modifications, and equivalents falling within the true spirit and scope of the appended claims.

INDUSTRIAL APPLICABILITY

The systems and methods disclosed herein are applicable to the oil and gas industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions, and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements, and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

What is claimed is:

1. A downhole gas separator for an artificial lift system, comprising:
   an outer casing joined to production tubing at one end and comprising a mount for a plug at an opposite end from the production tubing, wherein the outer casing comprises openings through the outer casing;

a dip tube extending through an interior of the outer casing, wherein the dip tube is fluidically coupled to the production tubing at one end, and is open to the outer casing at an opposite end, wherein the opposite end is proximate to the mount for the plug; and the plug, disposed in the mount, wherein the plug comprises a latching device configured to allow the plug to be pulled through the production tubing to a surface; wherein the dip tube comprises the artificial lift system.

2. The downhole gas separator of claim 1, wherein the artificial lift system comprises a reciprocating piston pump.

3. The downhole gas separator of claim 1, wherein the artificial lift system comprises a continuous pump.

4. The downhole gas separator of claim 1, wherein the openings comprise slots disposed around a circumference of the outer casing.

5. The downhole gas separator of claim 4, wherein the slots are disposed proximate to a coupling to the production tubing.

6. The downhole gas separator of claim 1, wherein the dip tube is proximate to a bottom surface of the outer casing.

7. The downhole gas separator of claim 1, comprising the mount configured to lock the plug in place at the end of the outer casing.

8. The downhole gas separator of claim 7, wherein the mount comprises a collet, and wherein the plug comprises flexible plates configured to snap into the collet.

9. The downhole gas separator of claim 1, wherein the plug comprises a small hole to equalize pressure upstream and downstream of the plug during removal.

10. The downhole gas separator of claim 1, wherein the plug has a smaller diameter than the production tubing.

11. A method for servicing a well having a downhole gas separator, comprising:
pulling a retrievable plug from the downhole gas separator to a surface through production tubing;
servicing the well through an open end of the downhole gas separator;
reinstalling the retrievable plug into the downhole gas separator through the production tubing; and
comprising pulling a pump from the well before pulling the retrievable plug.

12. The method of claim 11, comprising reinstalling a pump into the well after reinstalling the retrievable plug.

13. The method of claim 11, comprising determining that the well needs servicing by monitoring a production rate from the well.

14. The method of claim 11, wherein servicing the well comprises performing a coiled tubing workover (CTW) of the well.

15. The method of claim 14, wherein the CTW comprises a well cleanout operation.

16. A system for producing liquids from a well, comprising:
production tubing placed inside a well casing for transferring liquids to a surface;
a downhole gas separator, comprising:
an outer casing joined to production tubing at one end and comprising a fitting for a plug at an opposite end from the production tubing, wherein the outer casing comprises openings through the outer casing;
a dip tube extending through an interior of the outer casing, wherein the dip tube is fluidically coupled to the production tubing at one end, and is open to the outer casing at the opposite end, wherein the opposite end is proximate to the fitting for the plug; and
the plug, disposed in the fitting, wherein the plug comprises a retrieval bar configured to allow the plug to be pulled through the production tubing to a surface;
a pump fluidically coupled between the production tubing and the dip tube, the pump comprising a reciprocating piston pump; and
a pump jack coupled to the reciprocating piston pump through a rod.

17. The system of claim 16, comprising a wellhead, wherein the wellhead fluidically couples the production tubing to a production line for the liquids, and fluidically couples the well casing to a gas line.

18. The system of claim 16, wherein the downhole gas separator comprises a mount configured to lock the plug in place at the end of the outer casing.

19. The system of claim 16, wherein the plug has a smaller diameter than the production tubing.

* * * * *